(12) United States Patent
Hatakenaka

(10) Patent No.: US 8,313,822 B2
(45) Date of Patent: Nov. 20, 2012

(54) PRESSURE-SENSITIVE ADHESIVE SHEET

(75) Inventor: Hiroyuki Hatakenaka, Amagasaki (JP)

(73) Assignee: Lintec Corporation, Tokyo (JP)

( * ) Notice: Subject to any disclaimer, the term of this patent is extended or adjusted under 35 U.S.C. 154(b) by 310 days.

(21) Appl. No.: 12/668,737

(22) PCT Filed: Jul. 17, 2008

(86) PCT No.: PCT/JP2008/062943
§ 371 (c)(1),
(2), (4) Date: Mar. 16, 2010

(87) PCT Pub. No.: WO2009/011396
PCT Pub. Date: Jan. 22, 2009

(65) Prior Publication Data
US 2010/0196669 A1   Aug. 5, 2010

(30) Foreign Application Priority Data
Jul. 17, 2007   (JP) ................. 2007-185962

(51) Int. Cl.
*B32B 33/00*   (2006.01)
*B32B 3/00*   (2006.01)
*B32B 3/28*   (2006.01)
*B32B 9/00*   (2006.01)
*B32B 3/30*   (2006.01)

(52) U.S. Cl. ....... 428/172; 428/156; 428/343; 428/40.1; 428/42.1; 428/167

(58) Field of Classification Search .................. 428/40.1, 428/42.1, 156, 167, 166, 343
See application file for complete search history.

(56) References Cited

U.S. PATENT DOCUMENTS
2007/0039271 A1*   2/2007   Fleming et al. ................. 52/459

FOREIGN PATENT DOCUMENTS
| GB | 1 511 060 | 5/1978 |
| JP | 41-9198 | 5/1966 |
| JP | 51-45137 | 4/1976 |
| JP | 59-44750 | 3/1984 |

(Continued)

OTHER PUBLICATIONS

International Search Report issued Sep. 16, 2008 in International (PCT) Application No. PCT/JP2008/062943.

*Primary Examiner* — Catherine A Simone
(74) *Attorney, Agent, or Firm* — Wenderoth, Lind & Ponack, L.L.P.

(57) ABSTRACT

A pressure-sensitive adhesive sheet includes a sheet-like base and a pressure-sensitive adhesive layer integrally laminated on one side of the sheet-like base, and the pressure-sensitive adhesive layer has on the surface thereof two or more waved groove portions. Each of the waved groove portions has convex arcuate groove portions and concave arcuate groove portions disposed alternately and connected at connecting portions, and the total wavelengths of adjacent waved groove portions are different from each other. Each of the waved groove portions is configured such that all connecting portions of the convex arcuate groove portions with the concave arcuate groove portions are located on a virtual straight line; the virtual straight lines of all the waved groove portions are parallel to each other, and the intervals between the virtual straight lines of the waved groove portions are not constant.

13 Claims, 9 Drawing Sheets

FOREIGN PATENT DOCUMENTS

| | | |
|---|---|---|
| JP | 1-173147 | 12/1989 |
| JP | 7-138541 | 5/1995 |
| JP | 9-504201 | 4/1997 |
| JP | 2000-8009 | 1/2000 |
| JP | 2004-75845 | 3/2004 |
| JP | 3550096 | 8/2004 |
| WO | 95/11655 | 5/1995 |
| WO | 00/69985 | 11/2000 |
| WO | 03/025078 | 3/2003 |

\* cited by examiner

PRESSURE-SENSITIVE ADHESIVE SHEET

TECHNICAL FIELD

The present invention relates to a pressure-sensitive adhesive sheet that generates no air pockets between the adhesive layer of the pressure-sensitive adhesive sheet and an object to which the pressure-sensitive adhesive sheet is to be stuck, and that forms no irregularities, and that can be stuck beautifully to the surface of an object.

BACKGROUND ART

Heretofore, many pressure-sensitive adhesive sheets produced by integrally laminating a pressure-sensitive adhesive layer to one face of a sheet-like base made of a synthetic resin sheet have been proposed. These pressure-sensitive adhesive sheets are required to have various qualities depending upon their applications, and pressure-sensitive adhesive layers to be used for surface decoration are required to have a high design effect in color, decoration, and so on because they are to be used for exterior decoration of walls of buildings and surfaces of furniture, fixtures, and the like.

When a pressure-sensitive adhesive sheet is stuck to the surface of an object, the pressure-sensitive adhesive layer is pressed against the surface of the object from an arbitrary edge of the sheet by using a sticking tool such as a squeegee, and the pressure-sensitive adhesive layer of the pressure-sensitive adhesive sheet is stuck to the object gradually.

However, there is a problem that air enters into between the pressure-sensitive adhesive layer of the pressure-sensitive adhesive sheet and the surface of the object facing the pressure-sensitive adhesive layer to form an air pocket and this air pocket causes irregularities in the surface of the pressure-sensitive adhesive sheet for surface decoration, resulting in deterioration in exterior appearance of the pressure-sensitive adhesive sheet stuck to the object.

Patent document 1 proposes forming lattice-like groove portions in the surface of a pressure-sensitive adhesive layer of a pressure-sensitive adhesive sheet and discharging, through the grooves, air that has entered into between the pressure-sensitive adhesive layer of the pressure-sensitive adhesive sheet and the surface of an object facing the pressure-sensitive adhesive layer.

As to the lattice-like groove portions, a plurality of groove portions parallel to each other have been formed at fixed intervals and a plurality of groove portions perpendicular to those groove portions have been formed parallel to each other at fixed intervals. The pitch between the groove portions is limited to about 400 μm or less.

Since the pitch between the groove portions is very small as about 400 μm or less, projecting portions formed between the groove portions are also very small. On the other hand, in sticking the pressure-sensitive adhesive sheet to the surface of an object, when a sticking tool is pressed against the surface of the pressure-sensitive adhesive sheet, the pressure from the sticking tool is received by projecting portions formed between the groove portions. Since the projecting portions are very small, there is a problem that the projecting portions are deformed easily by the pressure applied by the sticking tool, so that irregularities are formed on the surface of the pressure-sensitive adhesive sheet, resulting in deterioration in the external appearance of the pressure-sensitive adhesive sheet.

Under such a situation, one probable solution is to increase the pitch between groove portions. However, when the pitch between the groove portions is excessively large, there was a problem that when air is captured between projecting portions formed between the grooves and the surface of an object facing the projecting portions, it is impossible to lead the air smoothly to the groove portions and the air is trapped between the projecting portions and the facing surface of the object facing the projecting portions.

Moreover, human eyes have a property of particularly easily recognizing objects regularly formed. As to a pressure-sensitive adhesive sheet having a pressure-sensitive adhesive layer in which groove portions have been formed in a lattice-like form regularly at a small pitch, the groove portions were easily recognized visually through the sheet-like base of the pressure-sensitive adhesive sheet. Therefore, there was a problem that drawing patterns, such as decorative patterns or letters, printed on the surface of the sheet-like base of a pressure-sensitive adhesive sheet are damaged by the groove portions.

Patent document 2 discloses a pressure-sensitive adhesive processing film including a pressure-sensitive adhesive film body and a pressure-sensitive adhesive layer integrally laminated on one side of the pressure-sensitive adhesive film body, wherein thin groove portions have been formed on the adhesive surface of the pressure-sensitive adhesive layer. As to the formation pattern of the groove portions, a lattice-like form, a wavy line form, a zigzag line form, and so on are proposed.

However, since the aforesaid groove portions have been formed regularly from a prescribed form repeated at a fixed period, there was a problem that the groove portions are easily recognized by human eyes as described above and the groove portions are recognized through the pressure-sensitive adhesive film body, so that decorative patterns and the like printed on the surface of the pressure-sensitive adhesive film body are damaged by the groove portions.

Moreover, patent document 3 discloses an article with an adhesive composed of a polymer film and a pressure-sensitive adhesive, wherein prescribed grooves have been formed on the surface of the pressure-sensitive adhesive. It is disclosed that the groove portions may be provided either in a regular pattern or in a random pattern (paragraph [0009]).

However, there was a problem that if grooves are provided in a regular pattern as described above, a decorative pattern or the like printed on the surface of the polymer film body will be damaged by the grooves. Although there is a disclosure that groove portions may be provided in a random pattern, no specific pattern of groove portions is disclosed and there was a problem that air taken into between the pressure-sensitive adhesive and an object cannot be discharged well through groove portions by only forming the groove portions randomly. Moreover, the groove portions are visually recognized through the polymer film, so that the same problem as that described above has arisen.

Patent document 1: WO 2003/025078
Patent document 2: JP 7-138541 A
Patent document 3: Japan Patent No. 3550096

DISCLOSURE OF THE INVENTION

Problem to be Solved by the Invention

The present invention provides a pressure-sensitive adhesive sheet such that when being stuck on the surface of an object, the sheet hardly forms an air pocket between a pressure-sensitive adhesive layer and the surface of the object facing the pressure-sensitive adhesive layer and irregularities are hardly formed on the surface of the sheet when the sheet is stuck on the surface of an object, wherein the sheet makes waved groove portions having been formed in the pressure-sensitive adhesive layer difficult to be recognized and does not damage drawing patterns, such as decorative patterns and letters, printed on the surface.

Means for Solving the Problem

The pressure-sensitive adhesive sheet of the present invention comprises a sheet-like base and a pressure-sensitive adhesive layer integrally laminated on one side of the sheet-like base, the pressure-sensitive adhesive layer having on the surface thereof two or more waved groove portions each composed of convex arcuate groove portions and concave arcuate groove portions connected alternately, wherein the two or more waved grooves are formed at intervals in the amplitude direction of the waved groove portions, and when two arbitrary waved groove portions adjacent to each other in the amplitude direction of the waved groove portions are defined as one waved groove portion and the other waved groove portion, respectively, the total wavelength of a convex arcuate groove portion and a concave arcuate groove portion which are connected together and constitute the one waved groove portion and the total wavelength of a convex arcuate groove portion and a concave arcuate groove portion which constitute the other waved groove portion and correspond to the convex arcuate groove portion and the concave arcuate groove portion constituting the one waved groove portion are different.

In other words, the pressure-sensitive adhesive sheet of the present invention contains a sheet-like base and a pressure-sensitive adhesive layer laminated on one side of the sheet-like base, wherein the pressure-sensitive adhesive layer has, on the surface thereof, two or more waved groove portions each composed of convex arcuate groove portions and concave arcuate groove portions connected alternately, wherein the two or more waved grooves are formed at intervals in the amplitude direction of the waved groove portions, and between waved groove portions adjacent to each other in the amplitude direction of the waved groove portions, the total wavelength of a convex arcuate groove and a concave arcuate groove connected together and constituting the one waved groove portion and the total wavelength of a convex arcuate groove portion and a concave arcuate groove portion constituting the other waved groove portion corresponding to the convex arcuate groove portion and the concave arcuate groove portion in the amplitude direction of the one waved groove portion are different.

In the above-mentioned pressure-sensitive adhesive sheet, the convex arcuate groove portions and the concave arcuate groove portions are arcs drawn by a sine function.

In the above-mentioned pressure-sensitive adhesive sheet, the two or more waved groove portions formed repeatedly in the amplitude direction comprises a waved groove portion having a first block portion including a waved groove portion in which the total wavelength of a convex arcuate groove portion and a concave arcuate groove portion connected together is a fixed length and a second block portion including a waved groove portion in which a convex arcuate groove portion and a convex arcuate groove portion have a total wavelength that is different from the total wavelength defined above.

In the above-mentioned pressure-sensitive adhesive sheet, the amplitude of the waved groove portions is constant and there is a space between the tops of waved groove portions adjacent to each other in the amplitude direction.

In the above-mentioned pressure-sensitive adhesive sheet, the waved groove portions adjacent in the amplitude direction of the waved groove portions are connected by a connecting groove portion.

Effect of the Invention

In the pressure-sensitive adhesive sheet of the present invention, waved groove portions have been formed in a prescribed shape and projecting adhesive portions have been formed between the waved groove portions. In the projecting adhesive portions, portions where waved groove portions are close to each other, i.e., portions with a small area, and portions where waved groove portions are distant from each other, i.e., portions with a large area, have been formed irregularly.

Even when sticking of the pressure-sensitive adhesive sheet to the surface of an object is performed by pressing a sticking tool to the surface of the pressure-sensitive adhesive sheet, projecting adhesive portions with a large area stably receive the pressure applied by the sticking tool. Therefore, it is not probable that the pressure-sensitive adhesive layer deforms to form irregularities on the surface of the pressure-sensitive adhesive sheet and, as a result, the appearance of the pressure-sensitive adhesive sheet stuck on the surface of an object deteriorates. When a drawing pattern, such as a decorative pattern or a letter, has been drawn on the surface of a pressure-sensitive adhesive sheet, the appearance of the drawing pattern becomes beautiful and clear.

In sticking the pressure-sensitive adhesive sheet to the surface of an object, even if air has entered into between the pressure-sensitive adhesive layer of the pressure-sensitive adhesive sheet and the surface of the object facing the pressure-sensitive adhesive layer, it is possible to lead the air having entered into between the facing surfaces of the pressure-sensitive adhesive sheet and the object to waved groove portions particularly through projecting adhesive portions with a small area and smoothly discharge the air outside regardless of the direction of rubbing the surface of the pressure-sensitive adhesive sheet with a sticking tool. Therefore, the pressure-sensitive adhesive sheet can be stuck smoothly to the surface of an object without the generation of an air pocket. This effect is obtained regardless of the direction of rubbing the surface of the pressure-sensitive adhesive sheet with a sticking tool.

Moreover, the waved groove portions adjacent to each other formed on the surface of the pressure-sensitive adhesive layer of the pressure-sensitive adhesive sheet have been formed so that they may differ in shape corresponding in their amplitude direction. Human eyes are highly capable of recognizing regular patterns but are of low capability of recognizing patterns with no regularity. Therefore, waved groove portions formed in the pressure-sensitive adhesive layer of a pressure-sensitive adhesive sheet are hardly recognized through a sheet-like base and drawing patterns drawn on the surface of the pressure-sensitive adhesive sheet are not damaged by the visual recognition of the waved groove portions and the drawing patterns drawn on the surface of the pressure-sensitive adhesive sheet can be well recognized visually.

EXPLANATION OF REFERENCE NUMERALS

Figure 1:
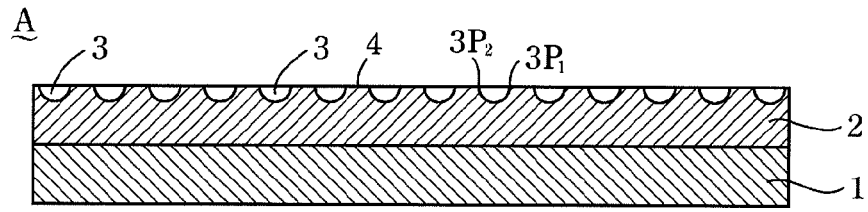
FIG. 1 A longitudinal sectional view illustrating the pressure-sensitive adhesive sheet of the present invention.

1: Sheet-like base
2: Pressure-sensitive adhesive layer
3: Waved groove portion
30: Connecting portion
31: Convex arcuate groove portion
32: Concave arcuate groove portion
4: Projecting adhesive portion
4a: Close portion
4b: Distant portion
A: Pressure-sensitive adhesive sheet
$B_1$: First block portion (i.e. a first of the waved groove portion)
$B_2$: Second block portion (i.e. a second portion of the waved groove portion)
L: Virtual straight line
S: Total wavelength of a convex arcuate groove portion and a concave arcuate groove portion

BEST MODE FOR CARRYING OUT THE INVENTION

One example of the pressure-sensitive adhesive sheet of the present invention is described with reference to drawings. In a pressure-sensitive adhesive sheet A, a pressure-sensitive adhesive layer 2 has been integrally laminated on one side of a sheet-like base 1 as illustrated in FIG. 1. The sheet-like base 1 is not particularly restricted if it is one having heretofore been used as a base of a pressure-sensitive adhesive sheet, and examples thereof include polyester-based resin sheets, such as a polyethylene terephthalate sheet, a polybutylene terephthalate sheet, and a polyethylene naphthalate sheet, polyolefin-based resin sheets, such as polyethylene and polypropylene, a polyvinyl alcohol sheet, and a polyvinylidene chloride sheet. A polyester-based resin sheet is preferable, and a polyethylene terephthalate sheet is more preferable.

While the pressure-sensitive adhesive layer 2 has been laminated integrally on one side of the sheet-like base 1, the pressure-sensitive adhesive that constitutes the pressure-sensitive adhesive layer 2 is not particularly restricted. Examples thereof include acrylic-based pressure-sensitive adhesives, rubber-based pressure-sensitive adhesives, and silicone-based pressure-sensitive adhesives, and acrylic-based pressure-sensitive adhesives are preferred. A release paper (not shown) may be laminated on the surface of the pressure-sensitive adhesive layer 2 so that it can be removed.

Figure 2:
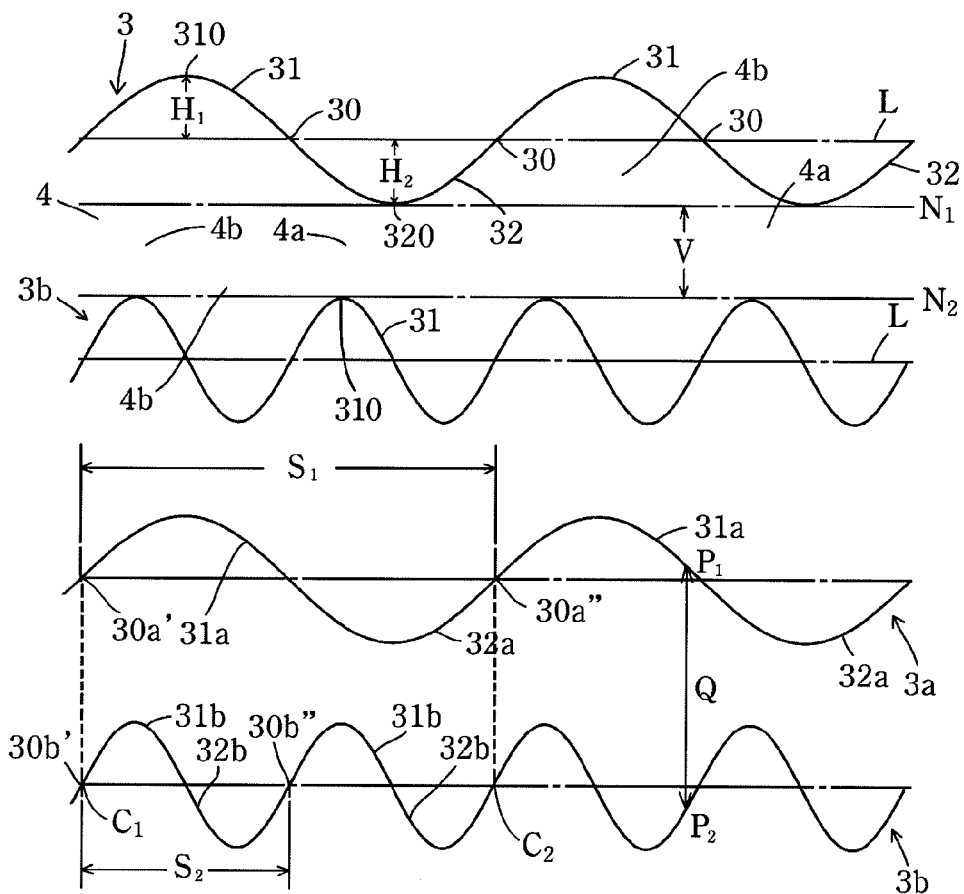
FIG. 2 A schematic plan view illustrating waved groove portions formed on the surface of the pressure-sensitive adhesive layer of a pressure-sensitive adhesive sheet.

On the surface of the pressure-sensitive adhesive layer 2 of the pressure-sensitive adhesive sheet A, waved groove portions 3 have been formed as illustrated in FIG. 2. In each of the waved groove portions 3, a convex arcuate groove portion 31 and a concave arcuate groove portion 32 have been formed while being connected alternately. Specifically, one end of the concave arcuate groove portion 32 is connected smoothly to one end of the convex arcuate groove portion 31, and one end of another convex arcuate groove portion 31 is connected smoothly to the other end of the concave arcuate groove portion 32. Thus, the convex arcuate groove portion 31 and the concave arcuate groove portion 32 have been alternately connected continuously, so that the waved groove portion 3 drawn by a sine function has been formed. All connecting portions 30, 30 . . . of the convex arcuate groove portion 31 with the concave arcuate groove portion 32 are located on a virtual straight line L. The convex arcuate groove portion refers to a groove portion that has a shape arcuately projecting upward in FIG. 2, and the concave arcuate groove portion refers to a groove portion that has a shape arcuately projecting downward in FIG. 2.

Moreover, although a height $H_1$ from one end or the other end of the convex arcuate groove portion 31 to a top 310 and a height $H_2$ from one end or the other end of the concave arcuate groove portion 32 to a top 320 may be either equal to or different from each other, they are preferably equal to each other. Moreover, the amplitude of the waved groove portion 3 is preferably constant along the entire length of the same waved groove portion 3.

Figure 3:
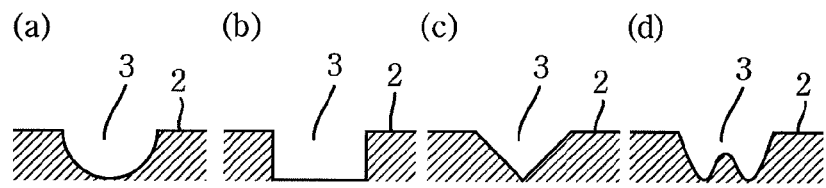
FIG. 3 End views each illustrating a waved groove portion.

The convex arcuate groove portion 31 and the concave arcuate groove portion 32 of the waved groove portion 3 are not particularly limited in sectional shape, and they may be semicircular in section as illustrated in FIG. 3(a), or rectangular in section as illustrated in FIG. 3(b), or triangular in section as illustrated in FIG. 3(c), or inverse-trapezoidal in section with part of the inner bottom surface raised in a W-shaped section as illustrated in FIG. 3(d).

Two or more waved groove portions 3 have been formed repeatedly in their amplitude direction, that is, the direction perpendicular to the connecting direction of the convex arcuate groove portion 31 and the concave arcuate groove portion 32 (the longitudinal direction of the virtual straight line L). It is preferable that an interval between adjacent waved groove portions 3, 3 is not constant because if it is constant, waved groove portions may be recognized visually as a pattern through a sheet-like base. The interval between the waved groove portions 3, 3 means the distance between the virtual straight lines L, L of the waved groove portions 3, 3.

The waved groove portions 3, 3 adjacent to each other in the amplitude direction of the waved groove portions 3 preferably have a gap formed between the tops of the waved groove portions 3, 3. In other words, it is preferable that in FIG. 2 there is a gap V between a line $N_1$ that passes the top 320 of the concave arcuate groove portion 32 of the waved groove portion 3 located above and is parallel to the virtual straight line L and a line $N_2$ that passes the top 310 of the convex arcuate groove portion 31 of the waved groove portion 3 located below and is parallel to the virtual straight line L. This is because there is a fear that the width of a close portion 4a in a projecting adhesive portion 4 formed between the convex arcuate groove portion 31 and the concave arcuate groove portion 32 becomes excessively narrow and is deformed easily by a pressing force from a sticking tool and, as a result, irregularities are formed on the surface of the pressure-sensitive adhesive sheet A.

When two arbitrary waved groove portions 3a, 3b adjacent to each other in the amplitude direction of the waved groove portions 3 are defined as one waved groove portion 3a and the other waved groove portion 3b, respectively. There is such a configuration that the total wavelength of an arbitrary convex arcuate groove portion 31a constituting the one waved groove portion 3a and a concave arcuate groove portion 32a connected to this convex arcuate groove portion 31a differs from the total wavelength of a convex arcuate groove portion 31b constituting the other waved groove portion 3b and a concave arcuate groove portion 32b connected to the convex arcuate groove portion 31b, the convex arcuate groove portion 31b and the concave arcuate groove portion 32b corresponding to the convex arcuate groove portion 31a and the concave arcuate groove portion 32a of the one waved groove portion 3a.

That is, there is such a configuration that the total wavelength of the arbitrary convex arcuate groove portion 31a constituting the one waved groove portion 3a and the concave arcuate groove portion 32a connected to this convex arcuate groove portion 31a differs from the total wavelength of the convex arcuate groove portion 31b constituting the other waved groove portion 3b and the concave arcuate groove portion 32b connected to the convex arcuate groove portion 31b, the convex arcuate groove portion 31b and the concave arcuate groove portion 32b being located at the positions to which the convex arcuate groove portion 31a and the concave arcuate groove portion 32a of the one waved groove portion 3a are projected along the amplitude direction of the waved groove portion 3.

Of the waved groove portions 3a and 3b that are adjacent to each other, the waved groove portion that is longer in the total wavelength of the convex arcuate groove portion 31a and the concave arcuate groove portion 32a is defined as the one waved groove portion 3a, whereas the waved groove portion that is shorter in the total wavelength of the convex arcuate groove portion 31b and the concave arcuate groove portion 32b is defined as the other waved groove portion 3b.

The total wavelengths of the convex arcuate groove portions 31a and 31b and the concave arcuate groove portions 32a and 32b being connected together, respectively, and constituting the waved groove portions 3a and 3b refer to lengths $S_1$ and $S_2$ of straight lines respectively connecting one end of each of the convex arcuate groove portions 31a and 31b and the other end of each of the concave arcuate groove portions 32a and 32b in the convex arcuate groove portions 31a and 31b and the concave arcuate groove portions 32a and 32b being connected together, respectively, and constituting the waved groove portions 3a and 3b.

In detail, the total wavelength of the convex arcuate groove portion 31a and the concave arcuate groove portion 32a being connected together and constituting the one waved groove portion 3a refers to a distance $S_1$ on the virtual straight line L, between a connecting portion 30a' with the concave arcuate groove portion 32a at one end of the arbitrary convex arcuate groove portion 31a and a connecting portion 30a" of the concave arcuate groove portion 32a connected to the convex arcuate groove portion 31a with the next convex arcuate groove portion 31a.

On the other hand, the total wavelength of the convex arcuate groove portion 31b and the concave arcuate groove portion 32b of the other waved groove portion 3b, the convex arcuate groove portion 31b and the concave arcuate groove portion 32b being located at positions to which the convex arcuate groove portion 31a and the concave arcuate groove portion 32a of the one waved groove portion 3a are projected along the amplitude direction of the waved groove portion 3a (i.e., the direction perpendicular to the virtual straight line L), refers to a distance $S_2$ on the virtual straight line L, between a connecting portion 30b' with the concave arcuate groove portion 32b at one end of the convex arcuate groove portion 31b and a connecting portion 30b" of the concave arcuate groove portion 32b connected to the convex arcuate groove portion 31b with the next convex arcuate groove portion 31b.

The convex arcuate groove portion 31b and the concave arcuate groove portion 32b located at positions to which the convex arcuate groove portion 31a and the concave arcuate groove portion 32a of the one waved groove portion 3a are projected along the amplitude direction of the waved groove portion 3a (i.e., the direction perpendicular to the virtual straight line L) refer to portions defined by the following procedure. A straight line is drawn in the amplitude direction of the waved groove portion 3a, preferably the direction perpendicular to the virtual straight line L, from the connecting point 30a' of the convex arcuate groove portion 31a and the concave arcuate groove portion 32a of the one waved groove portion 3a, and an intersection $C_1$ of this straight line and the virtual straight line L of the waved groove portion 3b is specified. Next, a straight line is drawn in the amplitude direction of the waved groove portion 3a, preferably the direction perpendicular to the virtual straight line L, from the connecting point 30a" of the convex arcuate groove portion 31a and the concave arcuate groove portion 32a of the one waved groove portion 3a, and an intersection $C_2$ of this straight line and the virtual straight line L of the waved groove portion 3b is specified. A part of a virtual straight line L of the other waved groove portion 3b located between the intersections $C_1$, $C_2$ is extracted. The convex arcuate groove portion 31b and the concave arcuate groove portion 32b located in the extracted part of the virtual straight line L of the waved groove portion 3b are referred to as the convex arcuate groove portion 31b and the concave arcuate groove portion 32b located at positions to which the convex arcuate groove portion 31a and the concave arcuate groove portion 32a of the one waved groove portion 3a are projected along the amplitude direction of the waved groove portion 3a (i.e., the direction perpendicular to the virtual straight line L).

In a case where at positions to which the convex arcuate groove portion 31a and the concave arcuate groove portion 32a of the one waved groove portion 3a are projected along the amplitude direction of the one waved groove portion 3a (i.e., the direction perpendicular to the virtual straight line L), there are two or more arcuate groove portion units where the convex arcuate groove portion 31b and the concave arcuate groove portion 32b of the other waved groove portion 3b are coupled as an arcuate groove portion unit, the total wavelength of the convex arcuate groove portion 31b and the concave arcuate groove portion 32b of each arcuate groove portion unit is calculated, and the arithmetic mean of the total wavelengths is defined as the total wavelength of the convex arcuate groove portion 31b and the concave arcuate groove portion 32b.

As to the convex arcuate groove portion 31b and the concave arcuate groove portion 32b which are located at positions to which the convex arcuate groove portion 31a and the concave arcuate groove portion 32a of the waved groove portion 3a are projected along the amplitude direction of the waved groove portion 3a, only those the whole portion of which is included are considered, whereas those only part of which is included are not considered.

When either arcuate groove portions of the convex arcuate groove portion 31b and the concave arcuate groove portion 32b are present more, this results in a state where the more arcuate groove portions are located at both end parts. In such a situation, arcuate groove portions in one of both the end parts are chosen so that the total wavelength of the convex arcuate groove portion 31b and the concave arcuate groove portion 32b may become larger.

The pressure-sensitive adhesive sheet A of the present invention has been configured so that the total wavelength $S_1$ of a convex arcuate groove portion and a concave arcuate groove portion of the one waved groove portion 3a may differ from the total wavelength $S_2$ of a convex arcuate groove portion and a concave arcuate groove portion of the other waved groove portion 3b. That is, in the pressure-sensitive adhesive sheet A of the present invention, the waved groove portion 3a and the waved groove portion 3b differing in total wavelength of the convex arcuate groove portion 31 and the concave arcuate groove portion 32 have been formed alternately along the amplitude direction of the waved groove portions.

As to the waved groove portions 3a and 3b adjacent to each other, the total wavelengths $S_1$ and $S_2$ of the convex arcuate groove portion 31 and the concave arcuate groove portion 32 have been made different from each other, and a distance Q between an arbitrary point $P_1$ on the waved groove portion 3a and a point $P_2$ on the waved groove portion 3b corresponding to $P_1$ in the amplitude direction of the waved groove portion 3a is irregularly varied along the longitudinal direction of the virtual straight line L. As a result, the projecting adhesive portion 4 formed between the waved groove portions 3a and 3b has been formed in an irregular shape.

As illustrated in FIG. 2, the projecting adhesive portion 4 irregularly has a close portion 4a with a smaller area where the waved groove portion 3a and the waved groove portion 3b are close to each other and a distant portion 4b with a larger area where the waved groove portion 3a and the waved groove portion 3b are distant from each other.

As described above, when the pressure-sensitive adhesive sheet A is stuck to an object, the pressure-sensitive adhesive sheet A is pressed gradually from the end thereof against the object with a sticking tool, and whereby the pressure-sensitive adhesive layer 2 of the pressure-sensitive adhesive sheet A is stuck gradually from its end to the object.

At this time, a pressing force generated by the sticking tool is applied to the pressure-sensitive adhesive layer 2 of the pressure-sensitive adhesive sheet A, and the pressing force is received by the projecting adhesive portion 4 of the pressure-sensitive adhesive layer 2. Since the projecting adhesive portion 4 irregularly has the distant portion 4b having a larger area as described above, the distant portion 4b of the projecting adhesive portion 4 stably receives the pressing force from the sticking tool without deforming. Therefore, the deformation of the pressure-sensitive adhesive layer 2 is prevented, and the formation of irregularities of the surface of the pressure-sensitive adhesive sheet A caused by the deformation of the pressure-sensitive adhesive layer 2 is prevented certainly. Moreover, also in sticking the pressure-sensitive adhesive sheet to an object, the appearance of the pressure-sensitive adhesive sheet does not deteriorate because a part where variation is large and a part where variation is small are present irregularly in combination.

In sticking the pressure-sensitive adhesive sheet A to the surface of an object, pressure is applied while rubbing the surface of the pressure-sensitive adhesive sheet A with a sticking tool, and the surface of the pressure-sensitive adhesive sheet A is rubbed with the sticking tool in irregular directions. When air has entered into between the pressure-sensitive adhesive layer 2 of the pressure-sensitive adhesive sheet A and the surface of the object facing the pressure-sensitive adhesive layer, the air is led to the waved groove portion 3a or 3b and discharged outside through the waved groove portion if the sliding direction of the sticking tool is the amplitude direction of the waved groove portion 3. On the other hand, if the sliding direction of the sticking tool is the longitudinal direction of the waved groove portion 3, that is, the connecting direction of the convex arcuate groove portion 31 and the concave arcuate groove portion 32, (i.e., the longitudinal direction of the virtual straight line L), it is possible to smoothly lead the air to any one of the waved groove portions 3 through the close portion 4a of the projecting adhesive portion 4 and discharge the air to the outside.

Thus, if the sticking tool is slid in any direction on the surface of the pressure-sensitive adhesive sheet A, the air that has entered unexpectedly into between the pressure-sensitive adhesive sheet A of the pressure-sensitive adhesive sheet A and the surface of an object facing the sheet can be discharged to the outside through the waved groove portion 3 smoothly.

The groove width of the waved groove portion 3 is preferably 5 to 100 μm, and more preferably 10 to 50 μm because if the groove portion is excessively narrow, the air may be discharged insufficiently, whereas if it is excessively wide, drawing patterns drawn on the surface of the pressure-sensitive adhesive sheet may be deteriorated due to visual recognition of the waved groove portions. Here, the groove width of the waved groove portion 3 refers to the shortest distance from an arbitrary position $3P_1$ of one opening edge of the waved groove portion 3 to another opening edge $3P_2$ opposite to the aforementioned opening edge.

The groove depth of the waved groove portion is preferably 2 to 20 μm because if the groove portion is excessively shallow, the air may be discharged insufficiently, whereas if it is excessively deep, this may have an adverse effect on the appearance of the pressure-sensitive adhesive sheet. Here, the groove depth of the waved groove portion refers to the shortest distance between the surface 2 of the pressure-sensitive adhesive layer and the deepest part of the waved groove portion 3, and the surface of the pressure-sensitive adhesive layer 2 is defined to be the surface of the pressure-sensitive adhesive layer 2 before forming the waved groove portion 3.

The amplitude of the waved groove portion is preferably 50 to 1000 μm, and more preferably 100 to 500 μm because if it is excessively small, the waved groove portion may be visually recognized as being a straight line, whereas if it is excessively large, the function to discharge air may deteriorate.

The total wavelength of the convex arcuate groove portion 31a and the concave arcuate groove portion 32a connected together of the one waved groove portion 3a (henceforth, also referred to simply as "wavelength") is as long as preferably 1 to 20 times, more preferably 4 to 10 times the amplitude. This is because if the wavelength is excessively greater than the amplitude, the groove portion becomes easier to be visually recognized as a straight line, whereas if it is excessively short, the wave form approaches an arcuate shape, such as a saw blade shape or a comb-like shape, so that the groove portion becomes easier to be visually recognized as a thick line. The appearance of the pressure-sensitive adhesive sheet may be deteriorated due to visual recognition. Specifically, the total wavelength of the convex arcuate groove portion 31a and the concave arcuate groove portion 32a is preferably 400 to 5000 μm.

The total wavelength of the convex arcuate groove portion 31b and the concave arcuate groove portion 32b connected together of the other waved groove portion 3b only should be within the range as that of the waved groove portion 3a and be different from the total wavelength of the waved groove portion 3a.

The difference between the total wavelength of the one waved groove portion 3a and the total wavelength of the other waved groove portion 3b is not particularly limited. When many waved groove portions are arranged in the amplitude direction, they may be recognized as repetition of the same pattern if the difference in wavelength between adjacent waved groove portions is small. If the difference in wavelength of adjacent waved groove portions is large, they may be recognized as a pattern. For this reason, the difference in wavelength between adjacent waved groove portions is preferably adjusted to a length as much as 0.01 to 0.1 times the total wavelength of the longer waved groove portion among the total wavelengths of the waved groove portions. Although the difference in wavelength should be a length of this ratio, specifically, it is preferably 10 to 100 μm. Even if waved groove portions in which the difference in total wavelength of the waved groove portions is smaller than the above-mentioned lower limit are arranged continuously, a visibility problem hardly occurs if the number of the waved groove portions is four or less.

A method for producing the above-mentioned pressure-sensitive adhesive sheet A is not particularly restricted. For example, a release sheet having a release-treated surface provided with convex portions having a pattern in conformity with waved groove portions is prepared first. Next, a pressure-sensitive adhesive is applied to the release-treated surface of the release sheet and then dried to form a layered sheet in which a pressure-sensitive adhesive layer has been laminated on the release-treated surface of the release sheet. Then, the pressure-sensitive adhesive sheet A can be produced by laminating the layered sheet to one surface of a sheet-like base with the pressure-sensitive adhesive layer facing the sheet-like base, transferring the pressure-sensitive adhesive layer to the surface of the sheet-like base, and integrally laminating them. On the other surface of the sheet-like base may have been previously printed drawing patterns, such as decorative patterns and letters, as needed.

Figure 4:
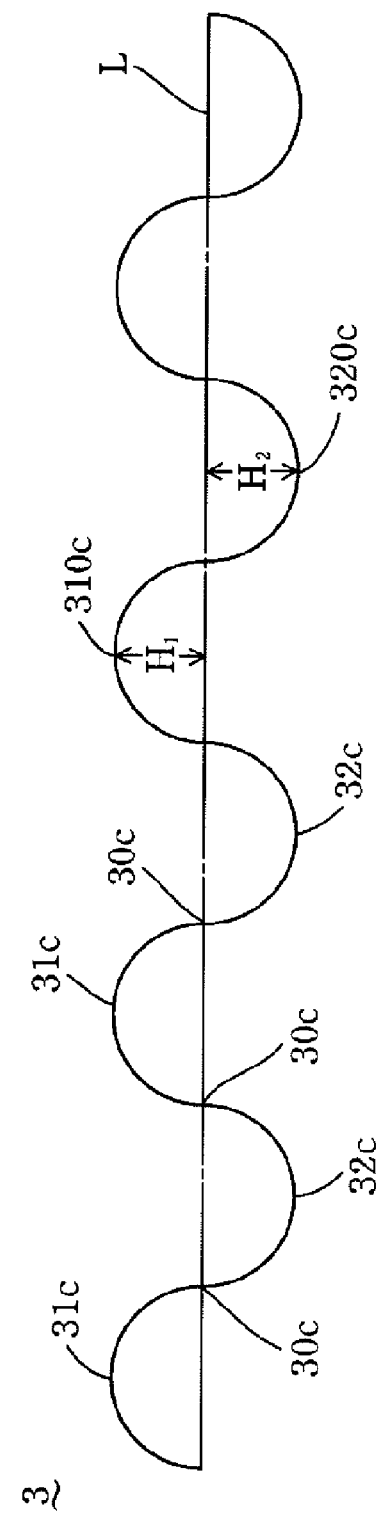
FIG. 4 A plan view illustrating another example of waved grooves.

As to the pressure-sensitive adhesive sheet A described above, although an embodiment in which a waved groove portion 3 has been formed from arcs drawn by a sine function while the convex arcuate groove portion 31 and the concave arcuate groove portion 32 have been connected alternately has been described, the waved groove portion 3 may be one in which, as illustrated in FIG. 4, a semicircular concave groove portion 32c has been connected at its one end to the other end of a semicircular convex arcuate groove portion 31c and another convex arcuate groove portion 31c has been connected at its one end to the other end of the foregoing concave arcuate groove portion 32c, so that the semicircular convex groove portion 31c and the concave groove portion 32c have been connected alternately. All connecting portions 30c, 30c . . . of the convex arcuate groove portion 31c with the concave arcuate groove portion 32c are located on the virtual straight line L.

Moreover, although the height $H_1$ from one end or the other end of the convex arcuate groove portion 31c to the top 310c and the height $H_2$ from one end or the other end of the concave arcuate groove portion 32c to the top 320c may be either equal to or different from each other, they are preferably equal to each other.

Figure 5:
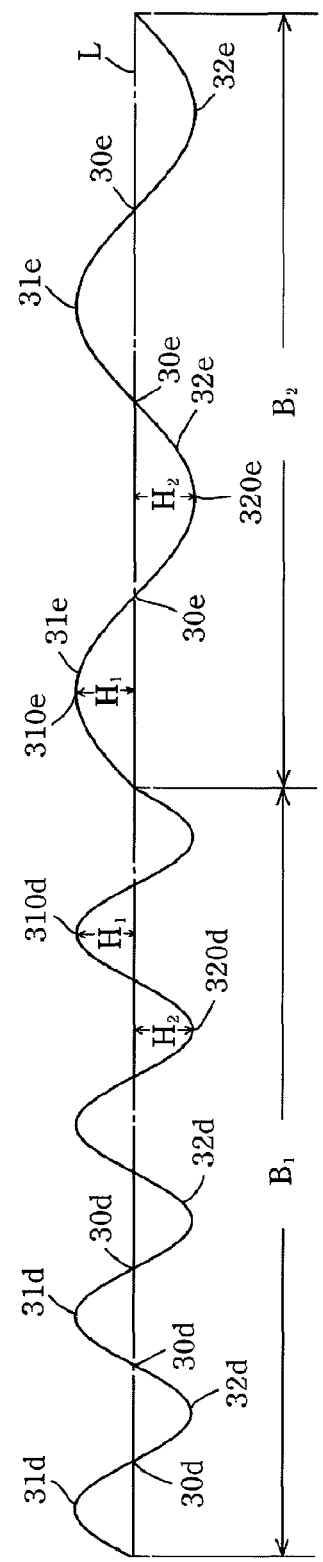
FIG. 5 A plan view illustrating another example of waved grooves.

As to the waved groove portion 3 described above, although an embodiment in which a waved form has been constituted by alternately continuously connecting the convex arcuate groove portions 31 with a prescribed shape and the concave arcuate groove portions 32 with a prescribed shape has been described, the waved groove portion 3 is also permissible which includes, as illustrated in FIG. 5, a first block portion $B_1$ including a convex arcuate groove portion 31d and a concave arcuate groove portion 32d having a prescribed total wavelength have been connected alternately continuously and a second block portion including a convex arcuate groove portion 31e and a concave arcuate groove portion 32e have been connected alternately continuously, the convex arcuate groove portion 31e and the concave arcuate groove portion 32e having a total wavelength different from the total wavelength of the convex arcuate groove portion 31d and the concave arcuate groove portion 32d constituting the first block.

That is, an embodiment is also permissible in which, in the same manner as the waved groove portion illustrated in FIG. 2, the first block portion $B_1$ has been formed by alternately continuously connecting the convex arcuate groove portion 31d and the concave arcuate groove portion 32d having a prescribed total wavelength, and the second block portion $B_2$ has been formed by alternately continuously connecting the convex arcuate groove portion 31e and the concave arcuate groove portion 32e that have a total wavelength different from the total wavelength of the convex arcuate groove portion 31d and the concave arcuate groove portion 32d constituting the first block part $B_1$, and one end of the second block portion $B_2$ has been connected continuously to the other end of the first block portion $B_1$, forming a waved groove portion. All connecting portions 30d, 30e of the convex arcuate groove portion 31d, 31e with the concave arcuate groove portion 32d, 32e are located on the virtual straight line L.

Although the height $H_1$ from one end or the other end of the convex arcuate groove portion 31d, 31e to the top 310d, 310e and the height $H_2$ from one end or the other end of the concave arcuate groove portion 32d, 32e to the top 320d, 320e may be either equal to or different from each other, they are preferably equal to each other.

Either or both of the waved groove portions 3a and 3b of FIG. 2 may be replaced with the waved groove portion 3 depicted in FIG. 4 and FIG. 5, or alternatively the waved groove portions 3, 3 depicted in FIG. 4 and FIG. 5 may be formed alternately in the amplitude direction of the waved groove portions. Also in this case, when two arbitrary waved groove portions adjacent to each other in the amplitude direction of the waved groove portion 3 are defined as one waved groove portion and the other waved groove portion, respectively, it is necessary that there should be such a configuration that the total wavelength of an arbitrary convex arcuate groove portion constituting the one waved groove portion and a concave arcuate groove portion connected to the convex arcuate groove portion is different from the total wavelength of a convex arcuate groove portion constituting the other waved groove portion and a concave arcuate groove portion connected to the convex arcuate groove portion, the convex arcuate groove portion and the concave arcuate groove portion being located at the positions to which the convex arcuate groove portion and the concave arcuate groove portion of the one waved groove portion are projected along the amplitude direction of the waved groove portion.

Figure 6:
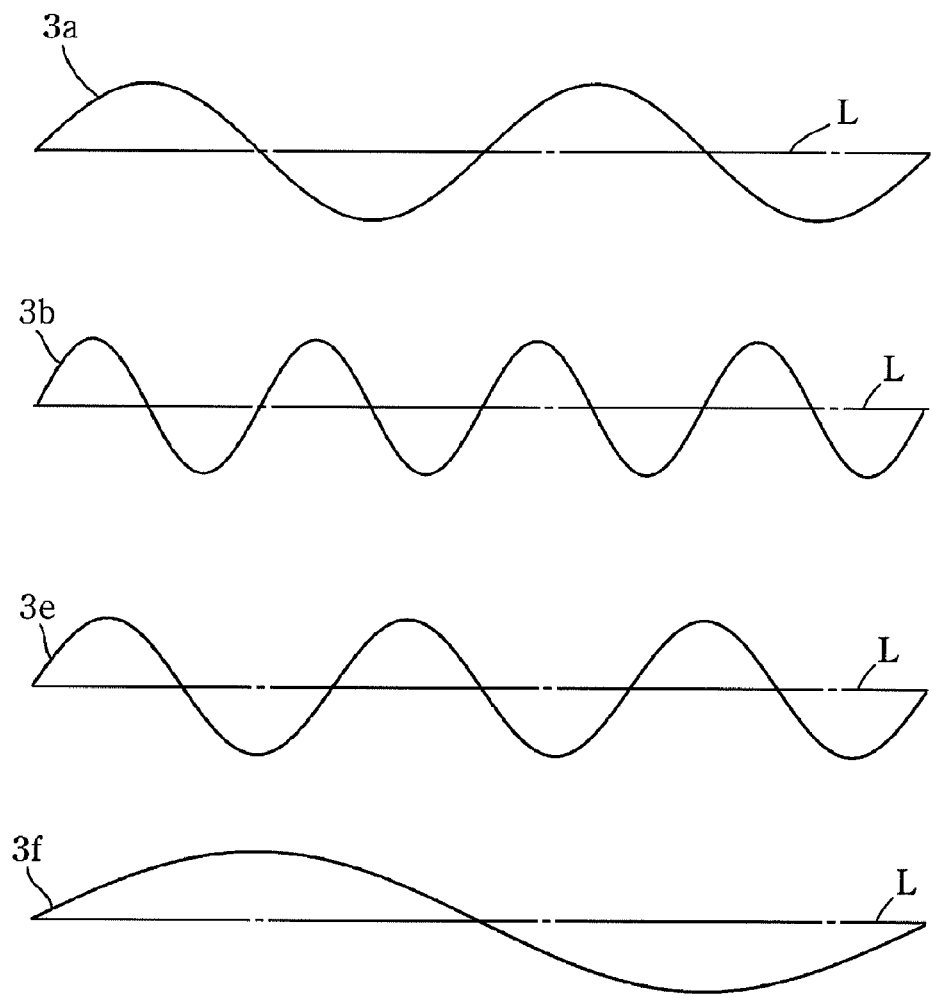
FIG. 6 A plan view illustrating another example of waved grooves.

Moreover, although an embodiment in which two types of waved groove portions differing in total wavelength are formed alternately in their amplitude direction has been described above, an embodiment is also permissible in which, as illustrated in FIG. 6, three or more types (preferably ten or more types) of waved groove portions 3a, 3b, 3e, and 3f (four types in FIG. 6) differing in the total wavelength of a convex arcuate groove portion and a concave arcuate groove portion have been formed repeatedly in an arbitrary order in the amplitude direction of these waved groove portions. Also in this embodiment, when two arbitrary waved groove portions adjacent to each other in the amplitude direction of the waved groove portion 3 are defined as one waved groove portion and the other waved groove portion, respectively, it is necessary that there should be such a configuration that the total wavelength of an arbitrary convex arcuate groove portion constituting the one waved groove portion and a concave arcuate groove portion connected to the convex arcuate groove portion is different from the total wavelength of a convex arcuate groove portion constituting the other waved groove portion and a concave arcuate groove portion connected to the convex arcuate groove portion, the convex arcuate groove portion and the concave arcuate groove portion being located at the positions to which the convex arcuate groove portion and the concave arcuate groove portion are projected along the amplitude direction of the waved groove portion.

Figure 7:
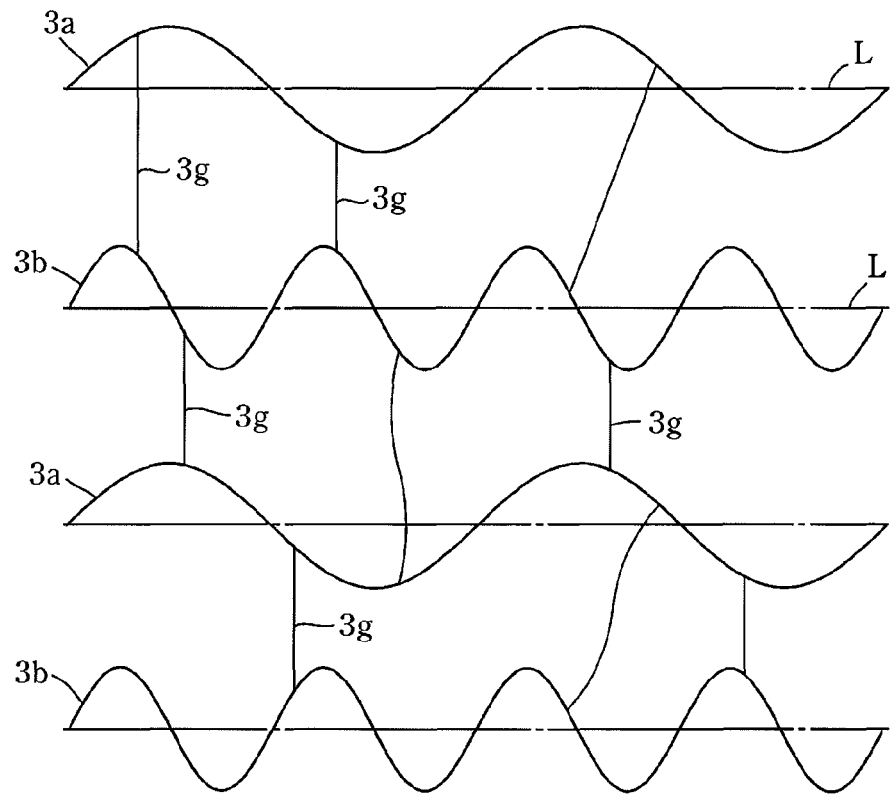
FIG. 7 A plan view illustrating another example of waved grooves.

Although an embodiment in which waved groove portions 3a and 3b adjacent in the amplitude direction of the waved groove portion 3 are not connected to each other has been described above, the waved groove portions 3a and 3b may be connected partly via straight or curved connecting groove portions 3g, 3g . . . as illustrated in FIG. 7. The connecting groove portion 3g may be either perpendicular or inclined with respect to the virtual straight line L.

By connecting the waved groove portions 3a, 3b partly via the connecting groove portions 3g, 3g, . . . in this manner, it is possible to discharge the air having entered into between the pressure-sensitive adhesive layer 2 of the pressure-sensitive adhesive sheet A and the surface of an object facing the pressure-sensitive adhesive layer to the outside through the waved groove portion 3 and the connecting groove portion 3g.

When two or more connecting groove portions 3g are formed, it is desirable that an interval between the connecting groove portions 3g, 3g adjacent to each other in the longitudinal direction of the virtual straight line L is irregular. By making the interval between the connecting groove portions 3g, 3g adjacent to each other irregular, it is possible to prevent a drawing pattern drawn on the surface of the pressure-sensitive adhesive sheet from being deteriorated due to visual recognition of the connecting groove portion 3g.

It is desirable that the connecting groove portion 3g connects only two waved groove portions 3a, 3b. This is because if the connecting groove portion 3g connects three or more waved groove portions, the length of the connecting groove portion becomes long, so that the connecting groove portion may be recognized visually through a sheet-like base.

EXAMPLES

Example 1

A release sheet in which a 25 μm-thick polyethylene layer had been laminated integrally to one side of a high-quality paper having a weight of 80 g/m² was prepared. On the surface of the polyethylene layer of the release sheet, convex portions with a trapezoidal section shape was formed in correspondence to the shape and pattern of the waved groove portions to be formed on the surface of the pressure-sensitive adhesive layer.

The convex portions on the polyethylene layer of the release paper were formed in the following procedure. First, a copper plate on one side of which transfer groove portions in a pattern which is the same as that of the waved groove portions to be formed on the pressure-sensitive adhesive layer was prepared. The transfer groove portions of the copper plate were formed by a conventional etching process.

The release sheet was superimposed on the transfer groove portions of the copper plate with the polyethylene layer of the release sheet facing the copper plate, and then a metal plate heated at 110° C. was superimposed entirely to the release sheet. Moreover, by forcing part of the release sheet into the transfer groove portions of the copper plate while melting the polyethylene layer of the release sheet by the addition of a pressure of 10 kg/cm² to the metal plate, convex portions having a shape and pattern in correspondence to the transfer grooves of the copper plate were formed on the polyethylene layer of the release sheet.

Next, on the polyethylene layer of the release sheet was applied an ethyl acetate solution (solid concentration: 45% by weight) of an acrylic-based pressure-sensitive adhesive with an applicator. The ethyl acetate solution of an acrylic-based pressure-sensitive adhesive was applied so that the applied amount after drying might become 30/m².

Then, the ethyl acetate solution of an acrylic-based pressure-sensitive adhesive on the release sheet was dried at 90° C. for 10 minutes, and thus a layered sheet in which an acrylic-based pressure-sensitive adhesive layer was laminated on the release sheet was obtained.

On the other hand, a 100 μm-thick soft polyvinylchloride film was prepared. On one side of this polyvinyl chloride film had been applied a glossy, mirror tone print. The layered film was superimposed on other side of the polyvinylchloride film with the acrylic-based pressure-sensitive adhesive layer facing to the polyvinylchloride film, and the acrylic-based pressure-sensitive adhesive layer was transferred and integrally laminated to the other side of the polyvinyl chloride film. Thus, a pressure-sensitive adhesive sheet was obtained. On the entire surface of the pressure-sensitive adhesive layer of the resulting pressure-sensitive adhesive sheet had been formed waved groove portions having the same shape and the same pattern as those of the transfer groove portions of the copper plate.

The waved groove portions formed on the surface of the pressure-sensitive adhesive layer of the obtained pressure-sensitive adhesive sheet were as follows. As to the waved groove portions, a plurality of waved groove portions composed of a convex arcuate groove portion and a concave arcuate groove portion connected alternately had been formed at intervals in the amplitude direction of the waved groove portions. The waved groove portions (a convex arcuate groove portion and a concave arcuate groove portion) were arcs drawn by a sine function. In each of the waved groove portions, the total wavelength of the convex arcuate groove portion and the concave arcuate groove portion and the amplitude were constant. The waved groove portions had a width of 30 μm and a depth of 12 μm.

For each of the waved groove portions, a height $H_1$ from one end or the other end to the top of the convex arcuate groove portion, a height $H_2$ from one end or the other end to the top of the concave arcuate groove portion, and a total wavelength S of the convex arcuate groove portion and the concave arcuate groove portion were as given in Table 1.

The interval between waved groove portions adjacent to each other was given in the column "Interval W" of Table 1. The interval between the waved groove portions adjacent to each other means the distance between virtual straight lines L, L of the waved groove portions. The interval of a first waved groove portion and a second waved groove portion was given in the column "Interval W" of the first waved groove portion.

Figure 8:
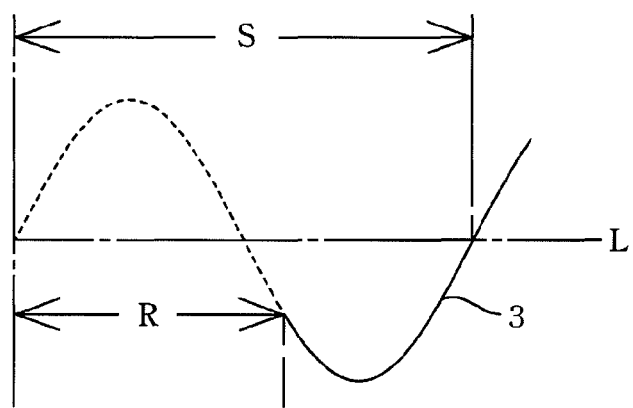
FIG. 8 A schematic view illustrating part of a waved groove portion formed on the surface of the pressure-sensitive adhesive layer of a pressure-sensitive adhesive sheet of examples.

Although the ends of all the waved groove portions begin with convex arcuate groove portions, the convex arcuate groove portions do not necessarily start from an intersection with the virtual straight line L, and some waved groove portions have been removed partly as illustrated in FIG. 8.

A removed length R of each waved groove portion was expressed by a percentage relative to the total length S of the convex arcuate groove portion and the concave arcuate groove portion, and it was given in the column "Removed length R" of Table 1. For example, as to the second waved groove portion, the "Removed length R" is 68%. Therefore, of the convex arcuate groove portion and the concave arcuate groove portion located at one end (left end) of the second waved groove portion, a part corresponding to 68% of the total wavelength of the convex arcuate groove portion and the concave arcuate groove portion has been removed. In FIG. 8, the part drawn by a dotted line is a removed part.

Figure 9:
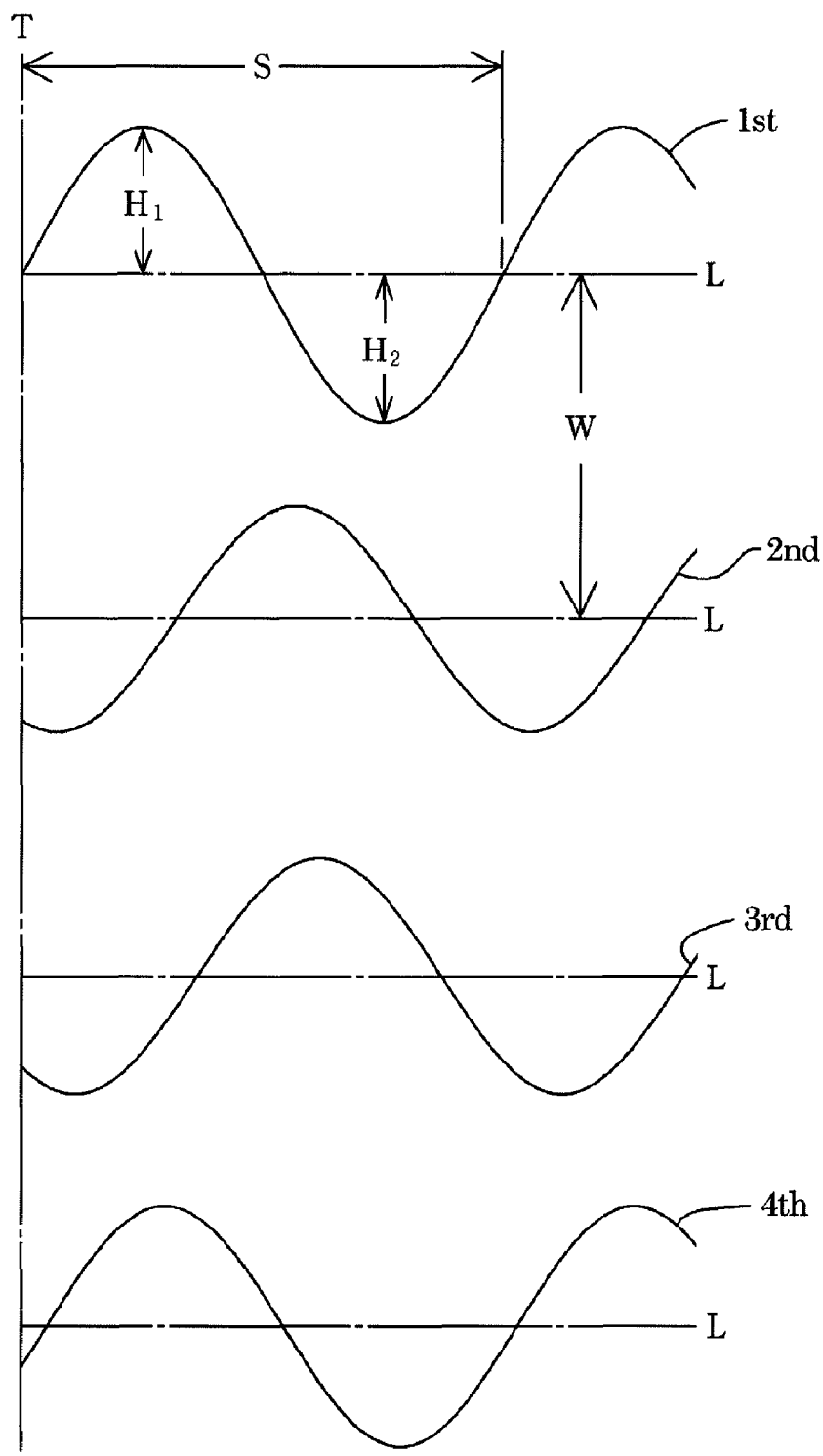
FIG. 9 A schematic view illustrating part of a waved groove portion formed on the surface of the pressure-sensitive adhesive layer of the pressure-sensitive adhesive sheet of Example 1.

The 1st to 50th waved groove portions were arranged in this order along the amplitude direction at the intervals given in Table 1. The one ends of all the 1st to 50th waved groove portions were located on a virtual straight line T extending along the arranged direction of the waved groove portions. The virtual straight lines L of all the waved groove portions were parallel to each other (see FIG. 9). In FIG. 9, the 1st to 4th waved groove portions are illustrated.

The 1st to 50th waved groove portions arranged in this order are collected to form a waved groove portion group, and this waved groove portion group was formed repeatedly in the amplitude direction of the waved groove portions (i.e., the direction perpendicular to a virtual straight lines L). The interval between the 50th waved groove portion of the waved groove portion group and the 1st waved groove portion of the waved groove portion group next to that waved groove portion group is provided in the column "Interval" of the 50th waved groove portion.

Example 2

A pressure-sensitive adhesive sheet was obtained in the same manner as in Example 1, except for preparing a copper plate on which transfer groove portions had been formed so that, as to each waved groove portion, the height $H_1$ from one end or the other end to the top of the convex arcuate groove portion, the height $H_2$ from one end or the other end to the top of the concave arcuate groove portion, the total wavelength S of the convex arcuate groove portion and the concave arcuate groove portion, the interval W between the waved groove portions adjacent to each other, and the removed length of the convex arcuate groove portion of the waved groove portion would become as given in Table 2. The waved groove portions had a width of 45 μm and a depth of 18 μm.

Example 3

Figure 10:
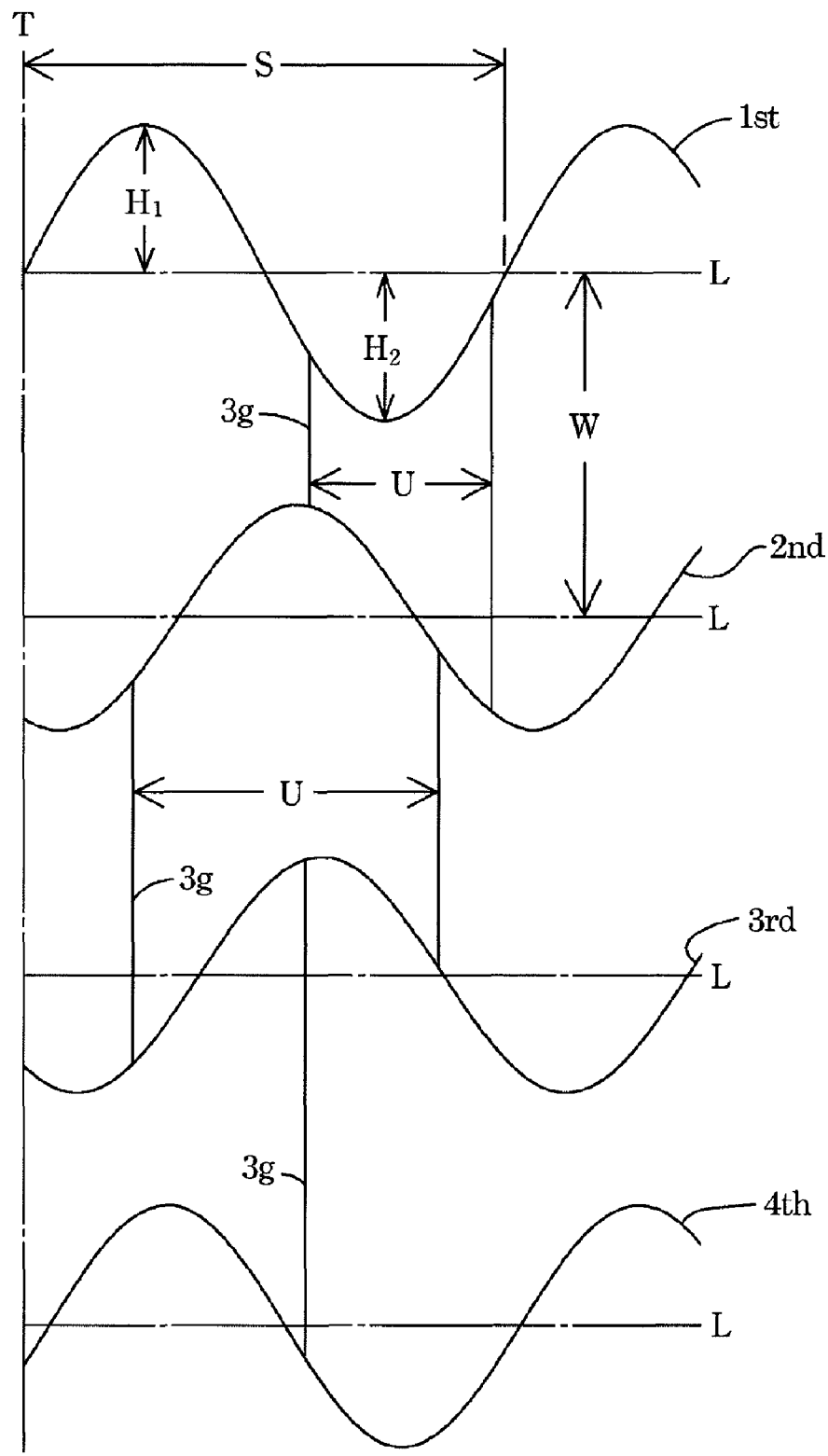
FIG. 10 A schematic view illustrating part of a waved groove portion formed on the surface of the pressure-sensitive adhesive layer of the pressure-sensitive adhesive sheet of Example 3.

As illustrated in FIG. 10, a pressure-sensitive adhesive sheet was obtained in the same manner as in Example 1, except for preparing a copper plate on which transfer groove portions had been formed so that waved groove portions adjacent to each other in the amplitude direction might be connected at two or more straight connecting groove portions in the waved groove portions of the pressure-sensitive adhesive layer formed in Example 1.

The connecting groove portion had a width of 30 μm and a depth of 12 μm. The interval U between the connecting groove portions was arbitrarily determined between 400 to 750 μm. The interval U between the connecting groove portions means the distance between connecting groove portions that connect two same waved groove portions. Adjustment was made so that the connecting groove portions would not be linked together.

Comparative Example 1

A pressure-sensitive adhesive sheet was obtained in the same manner as in Example 1, except for using a release sheet having no convex portions on its polyethylene layer and forming no waved groove portions on the surface of the pressure-sensitive adhesive layer of the pressure-sensitive adhesive sheet.

Comparative Example 2

Figure 11:
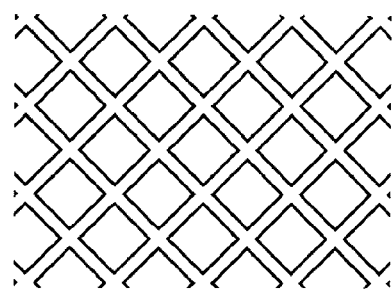
FIG. 11 A schematic view illustrating part of a waved groove portion formed on the surface of the pressure-sensitive adhesive layer of the pressure-sensitive adhesive sheet of Comparative Example 2 or 3.

A pressure-sensitive adhesive sheet was obtained in the same manner as in Example 1, except for using a copper plate having transfer groove portions formed so that groove portions would be formed in a lattice-like form as illustrated in FIG. 11. The groove portions had a width of 50 μm and a depth of 18 μm. The interval between parallel groove portions adjacent to each other was 500 μm.

Comparative Example 3

A pressure-sensitive adhesive sheet was obtained in the same manner as in Example 1, except for using a copper plate having transfer groove portions formed so that groove portions would be formed in a lattice-like form as illustrated in FIG. 11. The groove portions had a width of 30 μm and a depth of 12 μm. The interval between parallel groove portions adjacent to each other was 300 μm.

Comparative Example 4

Figure 12:
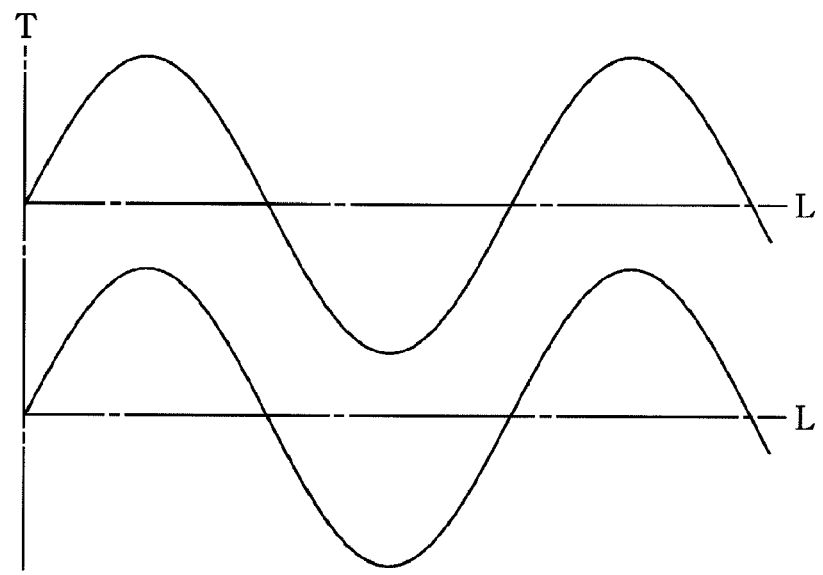
FIG. 12 A schematic view illustrating part of a waved groove portion formed on the surface of the pressure-sensitive adhesive layer of the pressure-sensitive adhesive sheet of Comparative Example 4.
Figure 13:
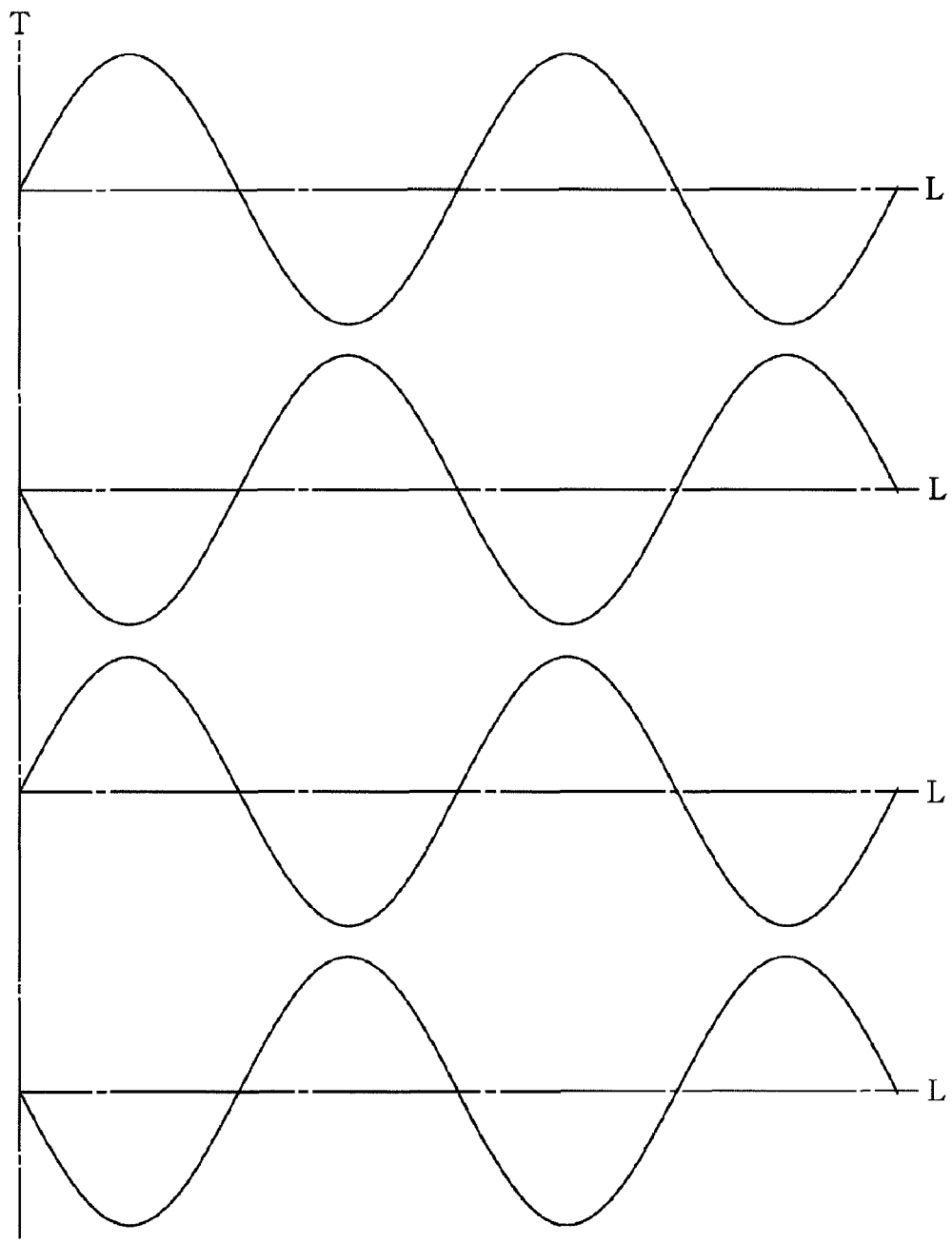
FIG. 13 A schematic view illustrating part of a waved groove portion formed on the surface of the pressure-sensitive adhesive layer of the pressure-sensitive adhesive sheet of Comparative Example 5.

A pressure-sensitive adhesive sheet was obtained in the same manner as in Example 1, except for preparing a copper plate on which transfer groove portions had been formed so that, as to each waved groove portion, the height $H_1$ from one end or the other end to the top of the convex arcuate groove portion, the height $H_2$ from one end or the other end to the top of the concave arcuate groove portion, the total wavelength S of the convex arcuate groove portion and the concave arcuate groove portion, the interval W between the waved groove portions adjacent to each other, and the removed length R of the convex arcuate groove portion of the waved groove portion would become as given in Table 3. Part of the waved groove portions formed on the surface of the pressure-sensitive adhesive layer of the pressure-sensitive adhesive sheet is illustrated in FIG. 12. The waved groove portions had a width of 30 μm and a depth of 12 μm. All the waved groove portions were the same and the interval W between the waved groove portions was 500 μm.

Comparative Example 5

A pressure-sensitive adhesive sheet was obtained in the same manner as in Example 1, except for preparing a copper plate on which transfer groove portions had been formed so that, as to each waved groove portion, the height $H_1$ from one end or the other end to the top of the convex arcuate groove portion, the height $H_2$ from one end or the other end to the top of the concave arcuate groove portion, the total wavelength S of the convex arcuate groove portion and the concave arcuate groove portion, the interval W between the waved groove portions adjacent to each other, and the removed length R of the convex arcuate groove portion of the waved groove portion would become as given in Table 4. The waved groove portions had a width of 30 μm and a depth of 12 μm. The waved groove portions had been formed with the first waved groove portion and the second waved groove portion arranged alternately in the amplitude direction. The interval W between the waved groove portions was 500 μm.

In Tables 1 to 4, "height $H_1$ from one end or the other end of a convex arcuate groove portion to the top", "height $H_2$ from one end or the other end of a concave arcuate groove portion to the top", "total wavelength S of a convex arcuate groove portion and a concave arcuate groove portion", and "interval W between waved groove portions adjacent to each other" were abbreviated as "height $H_1$", "height $H_2$", "total wavelength S", and "interval W between waved groove portions", respectively.

For the obtained pressure-sensitive adhesive sheets, the gas dischargeability and the design effect were measured by the procedures described below and the results thereof are shown in Table 5.

(Degassing Ability)

A flat square specimen 15 cm on each side was cut from the obtained pressure-sensitive adhesive sheet. On the other hand, a flat square acrylic plate 15 cm on each side was prepared. The specimen was stuck on its pressure-sensitive adhesive layer entirely to the smooth surface of the acrylic plate at a time. The state after pressing by a fingertip an air pocket formed between the acrylic plate and the pressure-sensitive adhesive sheet was visually observed and was judged on the basis of the following criteria.

Excellent: An air pocket disappeared completely.
Good: An air pocket disappeared almost completely, but the air pocket remained slightly.
Bad: An air pocket becomes smaller, but most of the air pocket remained.
Very bad: An air pocket almost completely failed to become smaller, and the most of the air pocket remained.

(Design Effect)

A flat square specimen 5 cm on each side was cut from the obtained pressure-sensitive adhesive sheet. On the other hand, a flat square transparent glass plate 10 cm on each side was prepared. The specimen was stuck gradually from the end thereof to the glass plate so that no air pocket would be formed between the specimen and the glass plate.

Then, the specimen was left at rest at 40° C. for 24 hours, and subsequently the surface of the specimen was visually observed and judgment was made on the basis of the following criteria using the specimen of Comparative Example 1 as a standard.

Excellent: The gloss of the surface of the specimen was uniform and no groove portions were visually recognized.
Good: The gloss of the surface of the specimen was a little uneven no groove portions were visually recognized.
Bad: An interference pattern occurred due to groove portions, and the interference pattern made the gloss of the surface of the specimen uneven.
Very bad: Groove portions were clearly recognized visually, so that the appearance of the specimen was damaged completely.

TABLE 1

| | Height $H_1$ (μm) | Height $H_2$ (μm) | Total wavelength S (μm) | Removed length R (%) | Interval W (μm) |
|---|---|---|---|---|---|
| 1st | 210 | 210 | 1000 | 0 | 489 |
| 2nd | 161 | 161 | 990 | 68 | 503 |
| 3rd | 168 | 168 | 1010 | 65 | 501 |
| 4th | 172 | 172 | 980 | 92 | 485 |
| 5th | 189 | 189 | 1000 | 84 | 502 |
| 6th | 215 | 215 | 1020 | 3 | 500 |
| 7th | 167 | 167 | 990 | 11 | 484 |
| 8th | 151 | 151 | 1000 | 5 | 508 |
| 9th | 192 | 192 | 980 | 72 | 473 |
| 10th | 197 | 197 | 1000 | 98 | 487 |
| 11th | 214 | 214 | 1010 | 60 | 484 |
| 12th | 172 | 172 | 1000 | 53 | 510 |
| 13th | 175 | 175 | 990 | 41 | 490 |
| 14th | 215 | 215 | 1020 | 62 | 483 |
| 15th | 213 | 213 | 1010 | 48 | 486 |
| 16th | 180 | 180 | 1000 | 82 | 477 |
| 17th | 168 | 168 | 990 | 60 | 482 |
| 18th | 167 | 167 | 1000 | 40 | 474 |
| 19th | 173 | 173 | 1010 | 25 | 504 |
| 20th | 168 | 168 | 1020 | 52 | 501 |
| 21st | 161 | 161 | 1010 | 47 | 468 |
| 22nd | 209 | 209 | 1040 | 63 | 487 |
| 23rd | 168 | 168 | 980 | 57 | 491 |
| 24th | 169 | 169 | 990 | 31 | 480 |
| 25th | 180 | 180 | 1000 | 75 | 475 |
| 26th | 204 | 204 | 1020 | 68 | 501 |
| 27th | 157 | 157 | 1000 | 18 | 481 |
| 28th | 158 | 158 | 980 | 9 | 510 |
| 29th | 200 | 200 | 1040 | 25 | 505 |
| 30th | 188 | 188 | 1000 | 47 | 479 |
| 31st | 187 | 187 | 990 | 25 | 492 |
| 32nd | 167 | 167 | 1000 | 22 | 496 |
| 33rd | 170 | 170 | 980 | 5 | 494 |
| 34th | 174 | 174 | 990 | 25 | 501 |
| 35th | 168 | 168 | 980 | 45 | 497 |
| 36th | 191 | 191 | 1010 | 28 | 502 |
| 37th | 181 | 181 | 1000 | 70 | 473 |
| 38th | 176 | 176 | 990 | 11 | 486 |
| 39th | 179 | 179 | 1000 | 7 | 477 |
| 40th | 185 | 185 | 1020 | 23 | 473 |
| 41st | 207 | 207 | 1040 | 90 | 515 |
| 42nd | 210 | 210 | 1030 | 27 | 509 |
| 43rd | 197 | 197 | 1040 | 15 | 500 |
| 44th | 189 | 189 | 1000 | 98 | 487 |
| 45th | 171 | 171 | 1000 | 22 | 493 |
| 46th | 156 | 156 | 980 | 36 | 504 |
| 47th | 167 | 167 | 1000 | 88 | 482 |
| 48th | 210 | 210 | 1040 | 19 | 492 |
| 49th | 199 | 199 | 1020 | 5 | 491 |
| 50th | 195 | 195 | 1010 | 13 | 468 |

TABLE 2

| | Height $H_1$ (μm) | Height $H_2$ (μm) | Total wavelength S (μm) | Removed length R (%) | Interval W (μm) |
|---|---|---|---|---|---|
| 1st | 420 | 420 | 2000 | 0 | 978 |
| 2nd | 322 | 322 | 1980 | 68 | 1006 |
| 3rd | 336 | 336 | 2020 | 65 | 1002 |
| 4th | 344 | 344 | 1960 | 92 | 970 |
| 5th | 378 | 378 | 2000 | 84 | 1004 |
| 6th | 430 | 430 | 2040 | 3 | 1000 |
| 7th | 334 | 334 | 1980 | 11 | 968 |
| 8th | 302 | 302 | 2000 | 5 | 1016 |
| 9th | 384 | 384 | 1960 | 72 | 946 |
| 10th | 394 | 394 | 2000 | 98 | 974 |
| 11th | 428 | 428 | 2020 | 60 | 968 |
| 12th | 344 | 344 | 2000 | 53 | 1020 |
| 13th | 350 | 350 | 1980 | 41 | 980 |
| 14th | 430 | 430 | 2040 | 62 | 966 |
| 15th | 426 | 426 | 2020 | 48 | 972 |
| 16th | 360 | 360 | 2000 | 82 | 954 |

TABLE 2-continued

|  | Height $H_1$ (μm) | Height $H_2$ (μm) | Total wavelength S (μm) | Removed length R (%) | Interval W (μm) |
|---|---|---|---|---|---|
| 17th | 336 | 336 | 1980 | 60 | 964 |
| 18th | 334 | 334 | 2000 | 40 | 948 |
| 19th | 346 | 346 | 2020 | 25 | 1008 |
| 20th | 336 | 336 | 2040 | 52 | 1002 |
| 21st | 322 | 322 | 2020 | 47 | 936 |
| 22nd | 418 | 418 | 2080 | 63 | 974 |
| 23rd | 336 | 336 | 1960 | 57 | 982 |
| 24th | 338 | 338 | 1980 | 31 | 960 |
| 25th | 360 | 360 | 2000 | 75 | 950 |
| 26th | 408 | 408 | 2040 | 68 | 1002 |
| 27th | 314 | 314 | 2000 | 18 | 962 |
| 28th | 316 | 316 | 1960 | 9 | 1020 |
| 29th | 400 | 400 | 2080 | 25 | 1010 |
| 30th | 376 | 376 | 2000 | 47 | 958 |
| 31st | 374 | 374 | 1980 | 25 | 984 |
| 32nd | 334 | 334 | 2000 | 22 | 992 |
| 33rd | 340 | 340 | 1960 | 5 | 988 |
| 34th | 348 | 348 | 1980 | 25 | 1002 |
| 35th | 336 | 336 | 1960 | 45 | 994 |
| 36th | 382 | 382 | 2020 | 28 | 1004 |
| 37th | 362 | 362 | 2000 | 70 | 946 |
| 38th | 352 | 352 | 1980 | 11 | 972 |
| 39th | 358 | 358 | 2000 | 7 | 954 |
| 40th | 370 | 370 | 2040 | 23 | 946 |
| 41st | 414 | 414 | 2080 | 90 | 1030 |
| 42nd | 420 | 420 | 2060 | 27 | 1018 |
| 43rd | 394 | 394 | 2080 | 15 | 1000 |
| 44th | 378 | 378 | 2000 | 98 | 974 |
| 45th | 342 | 342 | 2000 | 22 | 986 |
| 46th | 312 | 312 | 1960 | 36 | 1008 |
| 47th | 334 | 334 | 2000 | 88 | 964 |
| 48th | 420 | 420 | 2080 | 19 | 984 |
| 49th | 398 | 398 | 2040 | 5 | 982 |
| 50th | 390 | 390 | 2020 | 13 | 936 |

TABLE 3

| Height $H_1$ (μm) | Height $H_2$ (μm) | Total wavelength S (μm) | Removed length R (%) | Interval W (μm) |
|---|---|---|---|---|
| 210 | 210 | 1000 | 0 | 500 |

TABLE 4

|  | Height $H_1$ (μm) | Height $H_2$ (μm) | Total wavelength S (μm) | Removed length R (%) | Interval W (μm) |
|---|---|---|---|---|---|
| 1st | 210 | 210 | 1000 | 0 | 500 |
| 2nd | 210 | 210 | 1000 | 50 | 500 |

TABLE 5

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Degassing ability | Good | Good | Excellent | Very bad | Bad | Good | Good | Good |
| Design effect | Good | Good | Good | Excellent | Very bad | Bad | Bad | Bad |

INDUSTRIAL APPLICABILITY

The pressure-sensitive adhesive sheet of the present invention can adhere a sheet-like base to an object beautifully without forming irregularities on the sheet-like base and it is possible to used suitably for various applications, including advertisement application, by printing letters or drawing patterns to the surface of the sheet-like base.

The invention claimed is:

1. A pressure-sensitive adhesive sheet comprising a sheet-like base and a pressure-sensitive adhesive layer integrally laminated on one side of the sheet-like base,
    wherein the pressure-sensitive adhesive layer has on the surface thereof two or more waved groove portions,
    wherein each of the waved groove portions consists essentially of convex arcuate groove portions and concave arcuate groove portions disposed alternately and connected at connecting portions,
    wherein the two or more waved groove portions are formed at intervals in the amplitude direction of the waved groove portions,
    wherein a total wavelength of each waved groove portion is constituted by a combined length of one convex arcuate groove portion and one concave groove portion which are connected together,
    wherein the total wavelengths of adjacent waved groove portions are different from each other,
    wherein the convex arcuate groove portions and the concave arcuate groove portions are arcs defined by a sine function,
    wherein each of the waved groove portions is configured such that all of the connecting portions of the convex arcuate groove portions with the concave arcuate groove portions are located on a virtual straight line, and
    wherein the virtual straight lines of all the waved groove portions are parallel to each other, and the intervals between the virtual straight lines of the waved groove portions are not constant.

2. The pressure-sensitive adhesive sheet according to claim 1, wherein each of the waved groove portions includes a first portion and a second portion disposed sequentially in a wavelength direction of the waved groove portion, the first portion having a total wavelength that is a fixed length and the second portion having a total wavelength that is a fixed length, and the total wavelength of the first portion being different from the total wavelength of the second portion.

3. The pressure-sensitive adhesive sheet according to claim 1, wherein at least one of the waved groove portions includes a first portion and a second portion disposed sequentially in a wavelength direction of the waved groove portion, the first portion having a total wavelength that is a fixed length and the second portion having a total wavelength that is a fixed length, and the total wavelength of the first portion being different from the total wavelength of the second portion.

4. The pressure-sensitive adhesive sheet according to claim 3, wherein the amplitude of the waved groove portions is constant and there is a space between the tops of waved groove portions adjacent to each other in the amplitude direction.

5. The pressure-sensitive adhesive sheet according to claim 3, wherein the waved groove portions adjacent in the amplitude direction of the waved groove portions are connected by a connecting groove portion.

6. The pressure-sensitive adhesive sheet according to claim 3, wherein the waved groove portions adjacent in the amplitude direction of the waved groove portions are connected by a connecting groove portion.

7. The pressure sensitive adhesive sheet according to claim 3, wherein the difference between the total wavelengths of adjacent waved groove portions is as much as 0.01 to 0.1 times the total wavelength of the longer waved groove portion among the total wavelengths of the waved groove portions.

8. The pressure sensitive adhesive sheet according to claim 3, wherein the difference between the total wavelengths of adjacent waved groove portions is 10 μm to 100 μm.

9. The pressure-sensitive adhesive sheet according to claim 1, wherein the amplitude of the waved groove portions is constant and there is a space between the tops of waved groove portions adjacent to each other in the amplitude direction.

10. The pressure-sensitive adhesive sheet according to claim 9, wherein the waved groove portions adjacent in the amplitude direction of the waved groove portions are connected by a connecting groove portion.

11. The pressure-sensitive adhesive sheet according to claim 1, wherein the waved groove portions adjacent in the amplitude direction of the waved groove portions are connected by a connecting groove portion.

12. The pressure sensitive adhesive sheet according to claim 1, wherein the difference between the total wavelengths of adjacent waved groove portions is as much as 0.01 to 0.1 times the total wavelength of the longer waved groove portion among the total wavelengths of the waved groove portions.

13. The pressure sensitive adhesive sheet according to claim 1, wherein the difference between the total wavelengths of adjacent waved groove portions is 10μm to 100μm.

* * * * *